United States Patent Office 3,423,290
Patented Jan. 21, 1969

3,423,290
LYOPHILIZED REACTION MIXTURES
Robert C. Seamans, Jr., Deputy Administrator of the National Aeronautics and Space Administration with respect to an invention of Emmett W. Chappelle, Baltimore, Md.
No Drawing. Filed Aug. 3, 1966, Ser. No. 570,093
U.S. Cl. 195—99                                 9 Claims
Int. Cl. C12k 1/04; F21k 2/00

The invention described herein was made in the performance of work under a NASA contract and is subject to the provisions of Section 305 of the National Aeronautics and Space Act of 1958, Public Law 85–568 (72 Stat. 435; 42 U.S.C. 2457).

This invention relates to the storage of light producing compositions and more particularly to the storage of luciferase containing compositions which are to be utilized in life detection studies. Specifically, this invention is directed to the lyophilization of luciferase containing mixtures whereby stable, dry powders are produced.

The utilization of luciferase in life detection techniques has been the subject of considerable experimentation over the past years. This research was based on the light producing reactions of the firefly and the fact that all terrestrial life is intimately associated with and dependent upon the nucleotide phosphate adenosine-triphosphate (ATP). The bioluminescent reaction occurring in the firefly is the result of the reaction of oxygen with an oxidizable substraate (luciferin) catalyzed by an enzyme (luciferase). In order for this reaction to proceed the luciferin must first react with ATP before it can be oxidized for such light production.

For life detection use all of the ATP is first removed from any of the components of the luciferin-luciferase mixture after which the mixture is placed in proximity to the suspect area while maintaining a light fast environment. If life is present the ATP associaated therewith will activate the mixture with resultant light emission. This light can be measured by light monitoring equipment well known to those skilled in the art.

Although the above appears a fairly simple procedure for life detection it includes a number of complex problems. Of these one of the more vexing is how to stabilize the labile enzyme luciferase during the long periods of travel such as those encountered in interplanetary voyages. Besides time, stabilization is necessary against variations in temperature, pressures, etc. during these periods while the product must be instantaneously utilizable at substantially all times without encountering significant reconstitution problems.

It is an object of the present invention to provide a luciferase composition and methods for its preparation which is unaffected by minor variations of temperature and pressure and which is easily handled.

It is still another object of the present invention to provide a luciferase composition which is instantaneously utilizable without requiring extensive reconstitution or activation.

These and other objects of the present invention will become apparent from a consideration of the following detailed description and claims.

In general the composition of the instant invention is a lyophilized mixture of luciferase, luciferin, serum albumin and a source of magnesium ions to act as a catalytic agent in the luciferin-ATP reaction. This mixture is in form of a dry powder which may be activated by simple mixing with distilled water. The mixture desirably contains specific buffers for maximum activity.

The enzyme luciferase employed is derived from desiccated firefly tails by an extraction technique with final purification by column chromatography. Since the procedure is completely described in the publication "The Design and Fabrication of an Instrument for the Detection of Adenosinetriphosphate (ATP)" NASA CR–411, March 1966, prepared for the National Aeronautics and Space Administration by Hazleton Laboratories, Inc. and further since it forms no part of the instant invention a complete description of such preparation is not deemed necessary.

The luciferin may be derived as in the case of luciferase from fireflys by a series of extractions but due to residual ATP it is desirable to utilize synthetic luciferin produced by the methods of White et al. as described in J. Amer. Chem. Soc., 85, 337 (1963). It is generally provided in a water solution containing .5 to 1 mg. of luciferin per ml.

These two basic ingredients are combined with a source of magnesium ion usually derived from magnesium sulfate for catalytic effect and buffers such as glycyl clycine, sodium arsenate or trishydroxy methyl amino methane. The quantities of magnesium ions may vary in the resultant composition from less than .001 to .1 molar, maximum responses being obtained with ultimate concentrations of from .01 to .07 molar solutions.

It is desirable for maximum resultant activity that the pH of the composition be maintained at 7.4 but a range of pH of from 5–10 is permissible, a range of 6.5 to 8.5 being preferred.

Of principal importance is the addition of bovine serum albumin or other serum albumin to obviate the hydroscopicity problem of luciferase. It has been discovered that serum albumin acts to take up water before it can effect luciferase in a lyophilized product. Without this, if minute quantities of water do contact the luciferase a gelatinous unmanageable mass is produced which cannot be used for the experimental procedures contemplated. Further this additive will not effect the subsequent addition of large quantities of water, such additions to the dry lyophilized mixture resulting in a easily dissolved solution of dry mixture in the water. As stated above other serum albumins can be utilized including human, equine, etc. To provide the desired result the serum albumin must be present in sufficient amounts to bind the residual moisture without materially effecting the ATP activity or subsequent dissolving of the composition. Quantities of from .1 to .5 gram per liter are satisfactory although better control is exhibited in the range of from .25 to .35 gram per liter of initial solution.

Other materials may also be included in the composition. The sodium ethylene diamine tetraacetates (di, tri, tetra) may be present to act as complexing agents for metallic ions which might be present from the firefly extracts, water or other reagents utilized in recovery or manufacture of the composition components. Enzymes such as hexokinase may be included for reduced light levels due to their ability to form pyrophosphates from residual ATP.

The general techniques of lyophilization are known to the art but for the instant procedure it is essential that sterile conditions be maintained and the evaporation rate be such to insure minimum agitation of the solution. The procedure involves placing the mixture of luciferase, which is in liquid form from the extractive recovery, to which has been added luciferin, magnesium sulfate, serum albumin and the buffers in a flask imbedded in a Dry Ice-acetone mixture. After the mixture has been frozen a vacuum is applied until the pressure is reduced to about 2 microns. This condition is maintained for sufficient time to insure complete drying, such period generally ranging from 6 to 12 hours. Upon completion of the drying the vacuum is released and with maintenance of sterile conditions the flask is shaken whereby a pourable powder is obtained.

Other compositions may be used for the initial freezing including standard closed refrigerant cycles it only being important that the temperature be maintained below 0° C.

Having described the general details of the invention the following is a specific example thereof:

A reaction mixture containing 20 ml. of purified luciferase prepared from a Sephadex G-100 column (see NASA-CR-411, pp. 25-37) 20 ml. of luciferin (1 mg./ml.), 20 ml. of $MgSO_4$ (0.1 M) and 200 mg. of bovine serum albumin was prepared. The composition was buffered to a pH of 7.5 by .05 molar soduim arsenate and sodium ethylene diamine tetraacetate was added for complexing in an overall solution concentration of $1 \times 10^{-3}$ molar.

This solution was pretested for activity by removing a .3 ml. portion and adding .01 ml. of ATP ($1 \times 10^{-3}$ micrograms). The inherent light levels before ATP addition was 3250 c./30 sec. while after ATP addition it was 1,070,300 c./30 sec. The light measurement system and its operation are fully described in NASA-CR-411 referred to above at pages 158-203.

The remaining solution was placed in a flask and lyophilized by first freezing the composition in a Dry Ice-acetone bath (−37° C.) and thereafter applying a vacuum while maintaining the temperature below 0° C. The vacuum was maintained at 2 microns for 8 hours after which repressurization was allowed. The flask was removed from the Dry Ice-acetone bath and allowed to warm to room temperature. At this point the flask was shaken and the resultant powder poured into sterile storage containers.

A series of tests were conducted on the composition as follows:

The powder was mixed with water in the following concentrations and tested for both inherent light and ATP response: (ATP response based on .3 ml. solution with .01 ml. ATP ($1 \times 10^{-3}$ micrograms)).

| Concentration, mg./ml. | Inherent Light Counts/10 sec. | ATP Response Counts/10 sec. |
|---|---|---|
| 1.25 | 0 | 4,350 |
| 2.50 | 218 | 10,110 |
| 5.0 | 250 | 28,200 |
| 10.0 | 650 | 56,440 |
| 25.0 | 1,522 | 130,460 |
| 50.0 | 13,260 | 152,200 |
| 100.0 | 13,700 | 79,080 |

A life study was conducted utilizing the optimum 50 mg./ml. concentration noted above, storage in between tests being at −8° C. with a desiccant.

| Time (Days) | Inherent Light, c./30 sec. | ATP Response, c./30 sec. |
|---|---|---|
| 0 | 1,500 | 725,394 |
| 2 | 1,650 | 740,290 |
| 5 | 1,400 | 675,475 |
| 13 | 1,450 | 600,035 |
| 24 | 1,210 | 496,254 |
| 45 | 650 | 235,150 |
| 60 | 410 | 198,275 |

These results indicate that lyophilization can be utilized as a technique for storing luciferase compositions for periods of over 60 days without destroying ATP response. Further for periods of up to 2 weeks the activity is substantially constant.

By the instant invention a composition is provided which finds application not only in the space program but also in any environment where life detection is desirable such as operating rooms, etc. It is easy to utilize and is substantially uneffected by pressures or minor temperature changes. With proper desiccation it can be easily stored and shipped. As noted in the life study it is preferred to store the lyophilized product at temperatures below 0° C., temperatures as low as −20° C. being satisfactory for activity maintenance.

As many widely different embodiments of this invention may be made without departing from the spirit and scope thereof, it is understood that the invention is not limited to the specific embodiments thereof except as defined by the appended claims.

What is claimed is:

1. A stable dry powder composition for use in life detection reactions consisting essentially of a lyophilized mixture of luciferase, luciferin, serum albumin, and a source of magnesium ions.

2. The composition according to claim 1 wherein the pH is maintained in the range of 6.5 to 8.5 by the incluusion of a buffer selected from the group consisting of glycyl glycine, sodium arsenate and trishydroxymethyl amino methane.

3. The composition of claim 2 including as a complexing agent, a sodium salt of ethylene diamine tetraacetate.

4. The composition of claim 1 wherein the magnesium is present as magnesium sulfate.

5. The composition of claim 1 wherein the serum albumin is bovine serum albumin.

6. The composition of claim 2 wherein the buffer is sodium arsenate and the pH is about 7.4.

7. A method of preparing a dry stable free flowing composition for use in life detection comprising the steps of combining purified luciferase solution from which substantially all ATP has been removed with luciferin solution, bovine serum albumin, and a source of magnesium ions; subjecting the composition to freezing conditions and thereafter, while maintaining the composition in a frozen condition, applying sufficient vacuum until complete drying is effected.

8. A method according to claim 7 wherein a buffer selected from the group consisting of glycyl glycine, sodium arsenate and trishydroxymethyl amino methane is added to the luciferase solution before freezing to provide an overall composition pH of 6.5 to 8.5.

9. A method acording to claim 8 wherein sodium EDTA is added as a complexing agent.

References Cited

UNITED STATES PATENTS 3,133,001   5/1964   Muset _____ 195—63

OTHER REFERENCES

Colowich et al., Methods in Enzymology vol. III, pp. 871 to 873, (1957).

ALVIN E. TANENHOLTZ, *Primary Examiner.*

U.S. Cl. X.R.
195—103.5, 63, 66